United States Patent

Morse

[15] 3,689,184
[45] Sept. 5, 1972

[54] INJECTION MOLDING DEVICE
[72] Inventor: Albert R. Morse, 21709 Chagrin Blvd., Beachwood, Ohio 44119
[22] Filed: May 11, 1970
[21] Appl. No.: 16,976

Related U.S. Application Data

[63] Continuation-in-part of Ser. No. 845,980, July 30, 1969, abandoned.

[52] U.S. Cl. .................. 425/245, 425/376, 425/208
[51] Int. Cl. ........................................... B28b 1/00
[58] Field of Search .18/12 SA, 12 SB, 12 SE, 30 SQ, 18/30 SR, 30 SS; 425/208, 376

[56] References Cited

UNITED STATES PATENTS

| | | | |
|---|---|---|---|
| 2,668,986 | 2/1954 | Miler | 425/378 |
| 3,425,096 | 2/1969 | Morse | 425/159 |
| 3,099,861 | 8/1963 | Gaspar et al | 425/245 |

*Primary Examiner*—H. A. Kilby, Jr.
*Attorney*—Fay, Sharpe and Mulholland

[57] ABSTRACT

Apparatus for the injection molding of plastic materials comprising an elongated cylindrical housing and a screw-ram supported within a bore in the housing. Heating means are provided near the discharge end of the housing to heat and melt plastic material therein. Flights project radially from the screw-ram and extend for only part of its length, the screw-ram being mounted for rotary and reciprocatory movement within the bore. The screw-ram includes supporting bearing means for centering itself within the bore. Passage means which extend through the bearing means provides communication from behind the bearing to its front. Drive means serve to impart a rotary movement of the screw-ram and also to intermittently transmit axial movement to it in the direction of the discharge opening. The flights support the screw-ram within the bore in a feed zone remote from the discharge opening. A melting zone is provided in an annular space between the screw-ram and the bore wall extending from near the discharge opening toward the feed zone, the flights being disposed in said feed zone and terminating short of the melting zone. Dry, unplasticized granular pellets of plastic material are fed to the feed zone through an opening in the bore wall and are urged forward along a tortuous path through the flights and toward the bearing means into a heated zone where heat is applied to melt the plastic for injection into a mold.

17 Claims, 10 Drawing Figures

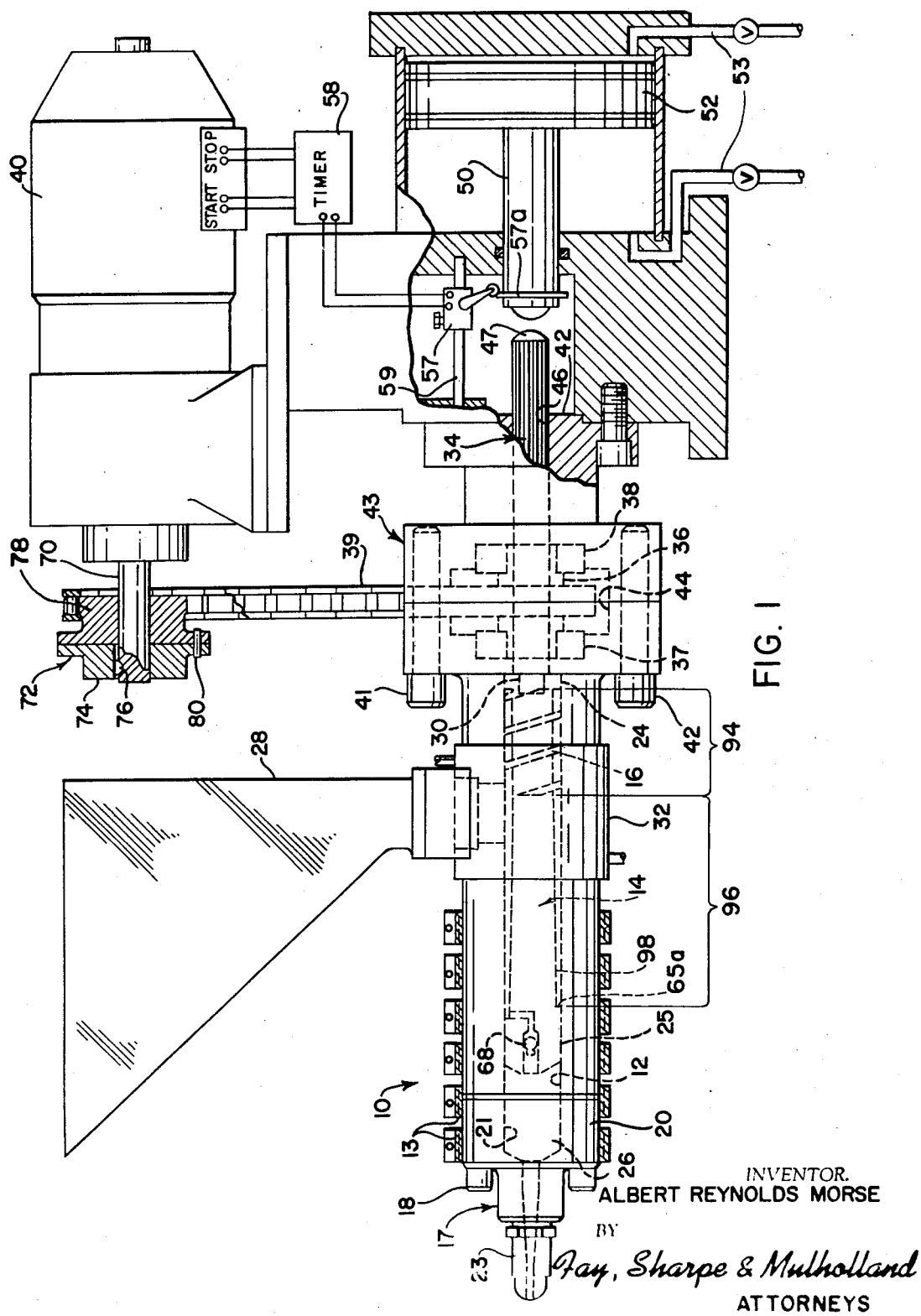

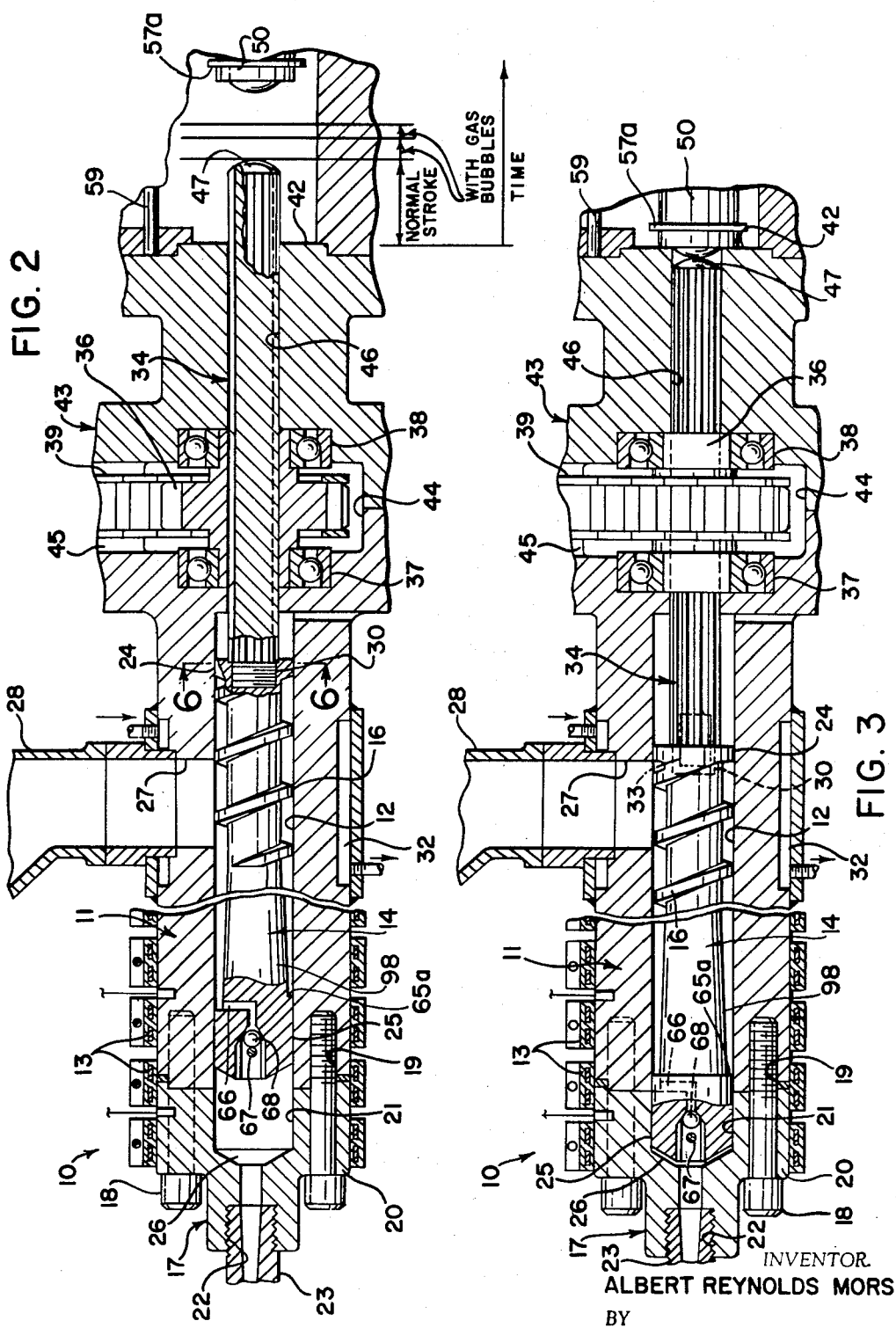

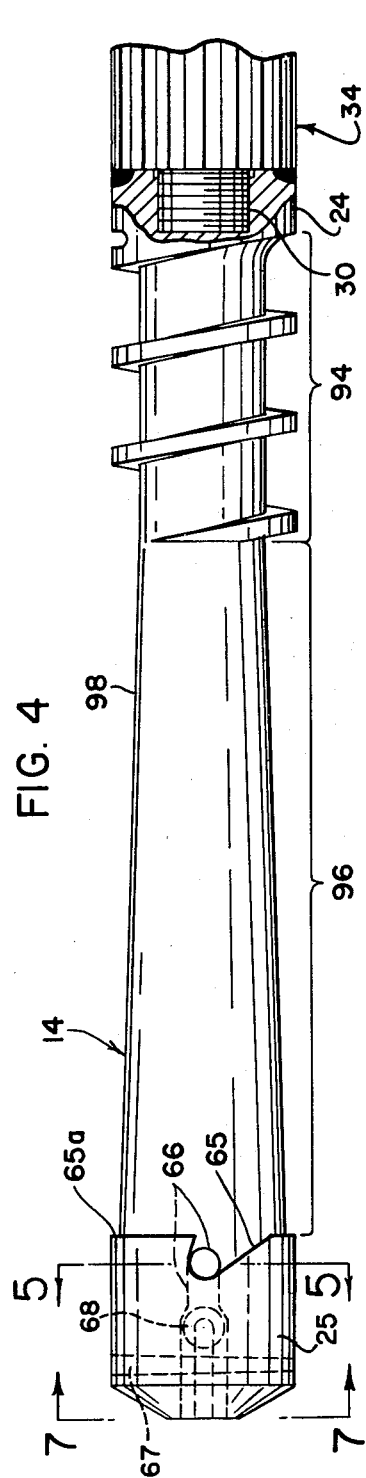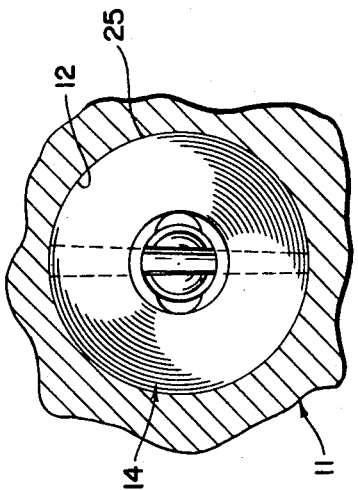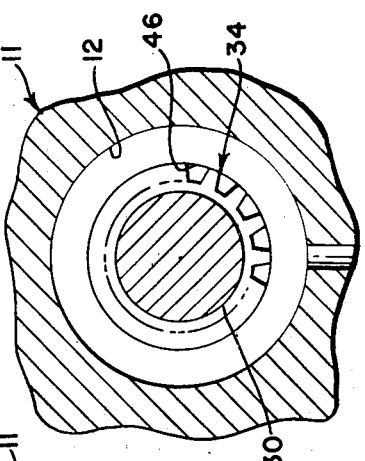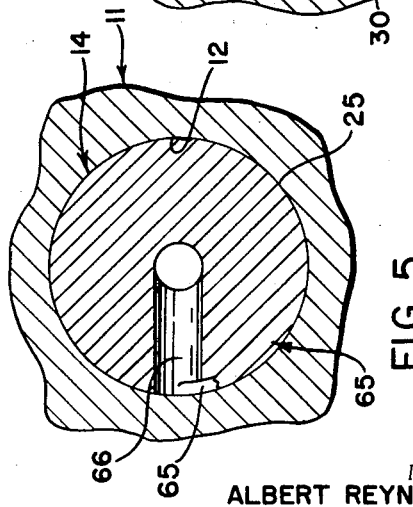

3,689,184

INJECTION MOLDING DEVICE

BRIEF DESCRIPTION OF THE INVENTION

This application is a continuation-in-part of my copending application entitled Injection Molding Device, filed July 30, 1969, Ser. No. 845,980, now abandoned.

The invention is particularly concerned with an improved apparatus for injection molding of plastic material and the apparatus used to precondition or melt the plastic charge for injection into a mold. It includes a housing having a bore therein with a discharge end adapted to operatively engage a mold. A screw-ram is substantially concentrically supported within the bore by bearing means adjacent its ends with closely engage the inner circumference of the bore and by flights which extend helically about a part of its length.

An opening through the housing into the bore area, remote from its discharge end is adapted for the feeding of pellets of plastic material into a feeding zone which includes a substantially helical passage defined by the spacing between the flights of the screw-ram.

From the feed zone which includes some flights, toward the discharge end of the housing, the screw-ram tapers outwardly in a single melting zone which terminates at the bearing means near the end of the screw-ram nearest the discharge end of the housing.

The dry pelletized plastic first traverses a tortuous passage which extends from the inlet opening, through the helical path formed by the flights, into an annular passage about an elongated frusto-conical surface in a plasticizing zone, through opening means in the forward most bearing and out through the discharge opening. A small amount of plastic melt flows around the periphery to the front of the forward most bearing to serve as a lubricant but the quantity is small relative to the total. The helical flights which extend for at least one-third the length of the screw-ram define only the first part of the tortuous passage, but they provide the means for urging the plastic forward as it slowly melts in the annular passage provided.

Means for heating are disposed about the housing adjacent the discharge end of the bore and the heat generated by the heating means serves to uniformly melt the pellets of plastic to condition them for injection into a mold. The plastic melt is extruded for temporary storage into a chamber formed between the support means at the discharge end of the housing and the forward end of the screw-ram. When sufficient charge is deposited in the chamber, independently actuated drive means forces the screw-ram forward, toward the discharge end of the housing, thereby discharging the melted plastic into a mold. Substantial backflow may be prevented by a non-return valve or otherwise controlled by screw-ram tip design; however, a small amount may flow rearwardly about the periphery of the forward bearing and this is good because of its lubricating function. Such flow occurs with a minimum of screw-ram wobble where the difference in radii between the bore and the forward bearing is in the range 0.0035 – 0.0050 inches.

It is an object of this invention to provide an improved high output, two zone reciprocating screw to be used in molding apparatus without such disadvantages as frictional heat generation, excess power consumption, etc., inherent in the full flighted, multizone extruder type screws heretofore used.

Further objects and features will be obvious from a detailed reading of the description of the preferred embodiments and the drawings.

BRIEF DESCRIPTION OF THE DRAWINGS

FIG. 1 is an elevational view of a segmented plastic injection unit, partially in section, which incorporates the novel partially flighted screw-ram of this invention;

FIG. 2 is an enlarged longitudinal cross-sectional view of the device illustrated in FIG. 1 when in the charging position;

FIG. 3 is a view similar to FIG. 2 during the final stage of injection, illustrating an alternative form of torque transmitting connection between the drive means and the screw;

FIG. 4 is an enlarged view, partially in section, of the improved screw-ram of this invention;

FIG. 5 is a cross-sectional view of the novel screw-ram taken along line 5—5 of FIG. 4;

FIG. 6 is a cross-sectional view taken along line 6—6 of FIG. 2;

FIG. 7 is a cross-sectional view taken along line 7—7 of FIG. 4;

PREFERRED EMBODIMENT

Figure 8:
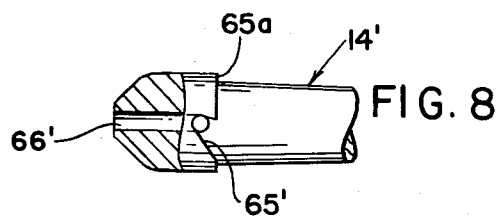
FIG. 8 is an elevational view, partially in section, showing a modified tip on the end of the screw-ram without a ball check.
Figure 9:
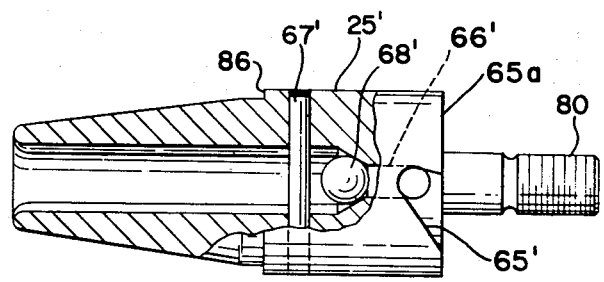
FIG. 9 is an elevational view, partially in section, showing a detachable tip incorporating certain features of this invention and adapted to be secured to existing screw-rams.
Figure 10:
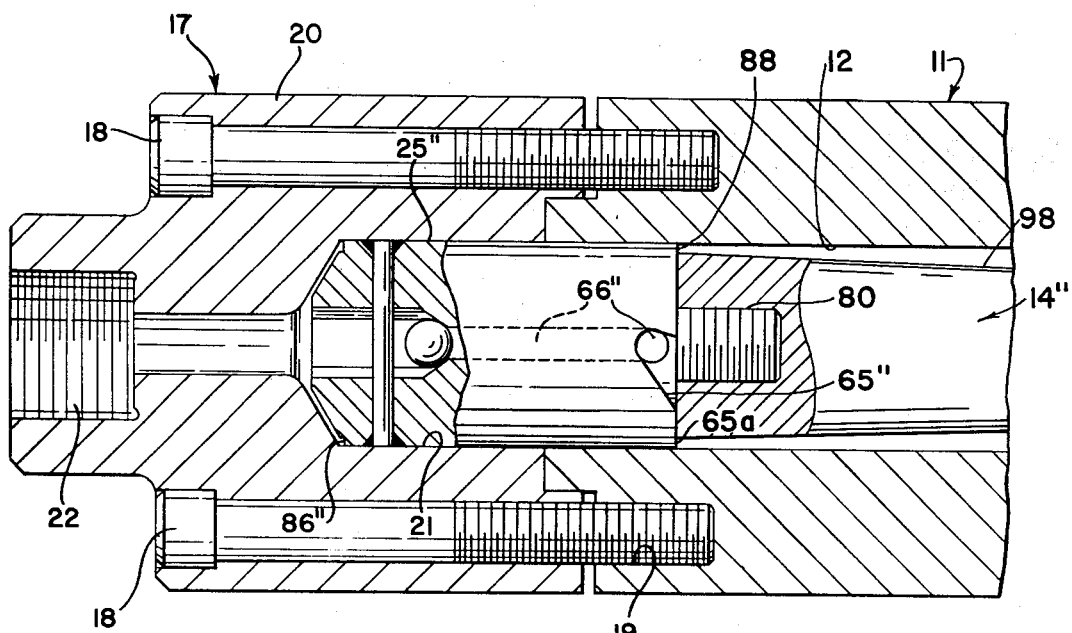
FIG. 10 is an elevational view, partially in section, showing a modified type of detachable tip portion with center discharge passage, with ball check therein in fluid communication secured to a screw-ram illustrated in the extreme forward position.

This invention is concerned with a novel arrangement and structure for a partially flighted screw-ram 14 which is incorporated in plastic injection molding apparatus substantially as illustrated in U.S. Pat. No. 3,425,096 to A. R. Morse. In the preferred embodiment of the novel improved screw 14 is incorporated into structure substantially identical with that shown in the above mentioned patent to A. R. Morse, and except as indicated below, the disclosure of the above identified patent is specifically incorporated into this specification, particularly from column 9, line 36 through column 14, line 53.

This invention differs from that of the above identified patent in that a new concept has been incorporated to prevent overheating of the plastic pellets from uncontrollable screw generated frictional heat during the melting. The drawings and numerals of this invention are the same as those of U.S. Pat. No. 3,425,096, except numerals 65a and 94–98 which are new and numerals 65, 65' and 65" which identified a convergence of the flights 16 adjacent a radially extending passage 66 which conducts the melted plastic through the center of the cylindrical portion 25 of the tapered nose or bearing complimentary to the tapered section between bore 12 and the end passageway 21. In the instant invention, the flights 16 do not extend to the cylindrical portion 25 of the screw-ram 14, and thus there is no convergence; the numerals 65, 65' and 65" in this invention identify the scoop for collecting and guiding the plastic melt past a radially extending shoulder 65a which forms the rear terminus of the cylindrical bearing portion 25, said portion 25 providing the outboard or forward support for screw-ram 14.

The flights 16 extend approximately one-third the length of the screw-ram 14 and serve only to convey the pelletized plastic away from the feed inlet 27 and urge them into and through an annular melting zone. The flights 16 are substantially coextensive with a feed zone 94, best illustrated in FIG. 4. The melting zone 96, where the pellets are to some extent, compressed into a smaller radial space between the screw-ram 14 and the bore surface 12, includes an outwardly tapering or frusto-conical surface 98 on the screw-ram which extends the entire length of the flightless area. The tapering surface 98 may be substantially coextensive with the melting or plasticizing zone 96 and terminate at the shoulder 65a.

Conventional multi-zone screws have radially projecting flights which extend continuously longitudinally through a feed zone with deep flights, then through a compression or transitional zone where the flights begin to get more shallow as the surface of the screw diverges, and finally through a metering or shear zone where the plastic material is placed in shear because the flights are very shallow. It has been found in these complex prior art screws that the combination of the heat generated by the shearing in the metering and transition zones with the heat from the heating means 13 excessively heats, burns and degrades the plastic. Obviously, whatever amount of excess heat is absorbed by the plastic melt must be taken out when it cools in the mold. Excessive heat will slow the molding cycle. This invention reduces the temperature of the plastic melt being injected from 20°–60° F., thus, accelerating the molding cycle.

The pellets of plastic supplied in the industry are usually not uniform in size, chemical composition or resistance to shear. Consequently, more heat will be generated in the shear action on some pellets than on others with a consequent uneven distribution of heat throughout the system, especially with reciprocating screws. The instant invention has overcome this problem by providing a partially flighted screw which terminates the flights 16 substantially at the beginning of the plasticizing zone 96 which is approximately one-third the length of the screw- ram. Because the flights 16 are eliminated for the remainder of the length of the screw-ram, the traditional shear or frictional heat which results from the shear is eliminated. Thus, a more uniform heat is applied to the pellets and a more uniform melt is generated which passes into the scoop 65, through the passage 66 and into the cavity between the cylindrical bearing portion 25 and the mold nozzle 23.

The result is a greater quantity of a more uniformly mixed melt which has an overall lower temperature than with all previously employed apparatus. This uniformity is accomplished by relying on the external electrical heating means 13 to supply substantially all of the heat to melt the plastic pellets. The elimination of flights in the plasticizing zone leaves a void which is filled by the pellets during the melting period with a resulting larger quantity of conditioned plastic within the zone at any one point in time. It is axiomatic to say that the greater the quantity, the more uniform will be the conditioning.

Obviously, with the elimination of the flights 16 near the forward end of the screw-ram 14, some positive supporting means must be supplied to center or to keep the screw-ram substantially concentric with the bore 12 and to prevent any waving around within the bore. This is accomplished by the cylindrical bearing surface 25 on the forward end of the screw-ram. Clearly, bearings other than that illustrated in the preferred embodiments may be employed. Examples of other bearing and tip structures are shown and described in an article entitled "Reciprocating Screw Tip Designs" authored by the inventor A. Reynolds Morse in the February, 1969 issue of the magazine "Plastics Design and Processing," pages 18–23.

It has been found useful in efficiently heating and melting the pellets of plastic material to have the pellets in a relatively narrow radial space between the inner circumference of the bore 12 and the outer circumference of the screw-ram 14. This provides excellent heat transfer to the plastic material, while at the same time it reduces screw cost and improves the plasticizing rate. The most efficient proportion discovered for the majority of plastics to be melted is to provide that the taper of the screw-ram in the melting zone 96 reduce the radial spacing to approximately one-half to one-third that in the feeding zone 94. For example, where the root of the flights 16 in the feeding zone 94 is approximately three-eighths inches the radial spacing between the surface of the screw-ram 14 and the bore 12 in the melting zone 96, as measured by the shoulder 65, would be approximately one-eighth to three-sixteenths inches. Stated differently, the height of the flights is approximately 1 ½ to two times the difference in radii between the screw shaft in the feed zone and the shaft at the forward end of the melting zone.

Because one aim of this invention is to provide a reciprocable screw-ram capable of handling all types of plastics without regard to screw design detail, the preferred form of the melt transition passage is a constant taper over the whole length of the flightless portion of the screw-ram. The length of the flightless section is sufficient to provide "L" over "D" ratios of 20 to 1 or 24 to 1, where "L" is the length of the screw and "D" is the diameter of the flights. The consolidation of earlier metering and compression zones into one melting zone represents a radial improvement in screw-rams designed for reciprocating.

It has been found that with a slight clearance between the bearing 25 and the bore wall 12 the plastic melt serves as a lubricant. Clearly the lubricated surfaces will have a longer useful life than those not lubricated. Experiments have indicated that clearances (differences in radii) in the range 0.0035 – 0.0050 inches are the most effective for most plastics, both from the standpoint of minimized galling and adequate forward support for centering the screw-ram in the bore. Thus, the front bearing 25 is smaller in diameter than the bore 12, in the range 0.0070 – 0.0100 inches. Without this clearance the plastic melt cannot flow with the necessary ease past the bearing 25 which results in a burning and discoloration of the melt between the bore wall and bearing.

It should be emphasized that the simplified two zone screw of this invention is designed expressly for use in the preparation of melt for use in injection or blow molding and is not necessarily recommended for stationary extrusion type screws where multi-zoned screws appear necessary. It should be emphasized that this flightless screw also represents the first known screw configuration suggested exclusively for reciprocation, as in injection and blow molding, whereas conventional extruder screws are nothing more than a pump designed to force hot plastic through a die.

It should also be emphasized that the particular screw used and described in this invention is not limited to use with a particular material to be molded. It may be used, for example, with polyolefins, styrenes, Nylons, acrylics, cellulosics, polycarbonates, vinyls and acetals. In fact, any thermoplastic material which is susceptible of molding may be used, as opposed to full flighted screws of the prior art where screw designs must be adapted to type of plastic.

In addition, although the preferred embodiment shows the axial drive member 50 as a separate part from the splined section 34, they may be integral or driven as a unit in the manner of many conventional injections molding charging devices. The instant invention which comprises the novel "flightless" screw-ram 14 provides a useful improvement which is universally adaptable to all present reciprocating screw molding apparatus.

The invention claimed is:

1. A device for use in the molding of plastic materials comprising,
   an elongated housing means,
   heating means to provide heat to said housing means,
   a cylindrical bore in said housing means having a discharge opening at one end,
   a partially flighted screw-ram mounted for rotary and reciprocatory movement within said bore and defining a tortuous passage in combination therewith,
   enlarged substantially cylindrical bearing means integral with said screw-ram for supporting the screw-ram substantially concentrically within the bore,
   a lateral passage in said bore adapted to provide communication between a material source and said tortuous passage,
   said tortuous passage being in substantially unrestricted communication with said lateral passage and said discharge opening,
   the screw-ram and housing defining a feed zone and a plasticizing zone which changes axial location relative to the bore during screw-ram reciprocation to keep the material moving and thereby avoid its inadvertent burning,
   flights projecting radially from the screw-ram adjacent said lateral passage extending through at least part of the feed zone and terminating short of the plasticizing zone.

2. The device of claim 1 wherein the screw-ram body is of greater diameter in the plasticizing zone than in the feeding zone.

3. The device of claim 1 wherein the flights extend not substantially greater than one-third the length of the screw-ram.

4. The device of claim 1 wherein the radial spacing between the screw-ram and the housing means in the feed zone is substantially in the range 1½½ to two times the spacing at the forward end of the plasticizing zone.

5. The device of claim 1 wherein the radial spacing between the screw-ram and the housing means in the feed zone is substantially in the range 1½ to two times the spacing at the forward end of the plasticizing zone.

6. The device of claim 5 wherein the flights extend not substantially greater than one-third the length of the screw-ram.

7. The device of claim 1 including first drive means interconnected with said screw-ram to impart rotary movement thereto, and
   means for intermittently transmitting axial force to said screw-ram in the direction of the discharge opening.

8. The device of claim 1 wherein the enlarged substantially cylindrical bearing means supporting the screw-ram within the bore is located adjacent the end of the screw-ram nearest the discharge end of the housing.

9. The device of claim 8 wherein the bearing is in the range 0.0035 – 0.0050 inches less in radius than the bore.

10. An injection molding device comprising,
    an elongated housing with a cylindrical bore therein,
    an injection mold nozzle secured to the forward end of the housing in fluid communication with said bore,
    a substantially solid screw-ram mounted for rotary and reciprocatory movement within said bore,
    integral bearing means near the forward end of said screw-ram for supporting the screw-ram substantially concentrically with said bore,
    radially extending flights intermediate the ends of said screw-ram extend substantially helically about the screw-ram for urging dry pellets of plastic forward from a feed zone toward the bearing means,
    an opening in said housing to receive pellets of plastic into said feed zone,
    a tapered surface on said screw-ram between the flights and the bearing means,
    means associated with said housing for heating the pellets of plastic for form a melt,
    passage means through the bearing means for conducting the melt into a cavity in said bore between the nozzle and the forward end of the screw-ram,
    means for rotating the screw-ram to drive the dry pellets and plastic melt forward relative to the screw-ram,
    means for periodically driving the screw-ram forward to eject the plastic melt from the cavity through the nozzle, said means for rotating the screw-ram and means for periodically driving the screw-ram forward combining to keep the melt moving axially relative to the bore to thereby avoid inadvertent burning of the melt, and
    means for retarding back flow of the melt from the cavity through the passage in the bearing means upon forward movement of the screw-ram.

11. The device of claim 10 wherein the bore is in the range 0.007 – 0.010 inches greater in diameter than the bearing means.

12. An injection molding device comprising, a housing having a cylindrical bore with a substantially solid screw-ram mounted for rotation and reciprocation within said bore, an injection nozzle at the forward end of the housing, means for rotating and reciprocating said screw-ram, an opening in the wall of said housing for feeding plastic material into a feed zone, flight means projecting radially from and disposed helically about said screw-ram in said feed zone for urging the plastic material forward toward a melting zone, the melting zone including heating means associated with said housing, an unobstructed annular plastic melt passage between the screw-ram and the cylindrical bore in the melting zone, said melt passage being of diminishing cross-sectional area in the forward direction, said melting zone changing axial location relative to the bore during screw-ram reciprocation to keep the material moving and thereby avoid its inadvertent burning, a tip on the forward end of the screw-ram including bearing means and aperture means through the tip, the bearing means defining at least part of a cylindrical surface slightly spaced from the bore for axial sliding and rotating movement, the aperture means extending through the tip to conduct the plastic melt from the melting zone to a cavity in the bore forward of the screw-ram, and means for retarding back flow of the plastic melt from the cavity through the aperture means upon forward movement of said screw-ram in said bore.

13. The injection molding device of claim 12 wherein the aperture means comprises a scoop formed in the tip in fluid communication with said annular passage which converges to a radial passage leading to the center of the tip, the radial passage merges into an axially aligned forwardly extending port opening to the front of the screw-ram.

14. The injection molding device of claim 12 wherein the plastic flow retarding means comprises a ball check valve.

15. The injection molding device of claim 12 wherein the flights extend not substantially greater than one-third the length of the screw-ram.

16. The injection molding device of claim 12 wherein the radial spacing between the screw-ram and the bore wall in the feed zone is substantially in the range 1½ to two times the radial spacing at the forward end of the melting zone adjacent the bearing means.

17. The device of claim 10 wherein the radius of the bore is in the range 0.0035 – 0.0050 inches greater than the radius of the bearing.

* * * * *